United States Patent
Baxter et al.

(10) Patent No.: US 10,451,202 B2
(45) Date of Patent: Oct. 22, 2019

(54) HOSES WITH ENDCAPSULATED SPRINGS

(71) Applicants: Larry Baxter, Orem, UT (US); Nathan Davis, Bountiful, UT (US); Aaron Sayre, Spanish Fork, UT (US); David Frankman, Provo, UT (US); Kyler Stitt, Lindon, UT (US); Joe Fox, Spanish Fork, UT (US); Skyler Chamberlain, Provo, UT (US)

(72) Inventors: Larry Baxter, Orem, UT (US); Nathan Davis, Bountiful, UT (US); Aaron Sayre, Spanish Fork, UT (US); David Frankman, Provo, UT (US); Kyler Stitt, Lindon, UT (US); Joe Fox, Spanish Fork, UT (US); Skyler Chamberlain, Provo, UT (US)

(73) Assignee: Hall Labs LLC, Provo, UT (US)

( * ) Notice: Subject to any disclaimer, the term of this patent is extended or adjusted under 35 U.S.C. 154(b) by 20 days.

(21) Appl. No.: 15/603,665

(22) Filed: May 24, 2017

(65) Prior Publication Data

US 2018/0340635 A1    Nov. 29, 2018

(51) Int. Cl.
| | |
|---|---|
| *F16L 11/12* | (2006.01) |
| *F16K 7/06* | (2006.01) |
| *F16L 11/08* | (2006.01) |
| *F16L 55/10* | (2006.01) |

(52) U.S. Cl.
CPC .............. *F16L 11/12* (2013.01); *F16K 7/061* (2013.01); *F16L 11/08* (2013.01); *F16L 55/10* (2013.01)

(58) Field of Classification Search
USPC .......................................................... 251/7
See application file for complete search history.

(56) References Cited

U.S. PATENT DOCUMENTS

| | | | | |
|---|---|---|---|---|
| 3,513,874 A | * | 5/1970 | Welsh ................... | F16K 1/40 137/637 |
| 4,140,154 A | * | 2/1979 | Kanao ................... | F16L 11/10 138/122 |
| 7,367,358 B2 | * | 5/2008 | Malcolm ........... | A61M 5/16827 137/595 |

FOREIGN PATENT DOCUMENTS

| | | | |
|---|---|---|---|
| WO | WO 9317240 A1 * | 9/1993 | .......... F04B 43/0072 |

OTHER PUBLICATIONS

WO9317240, Robert Hawes Bartlett, Sep. 2, 1993, WIPO.*
U.S. Appl. No. 10/047,863, filed Aug. 2018, Baxter; Larry.*

* cited by examiner

*Primary Examiner* — Marina A Tietjen
*Assistant Examiner* — Daphne M Barry

(57) ABSTRACT

A device is disclosed comprising a pinchable hose with an inner wall and an outer wall. The hose comprises a flexible material and one or more springs. A central axis of the one or more springs is contained within a space between the inner wall and the outer wall of the hose.

20 Claims, 17 Drawing Sheets

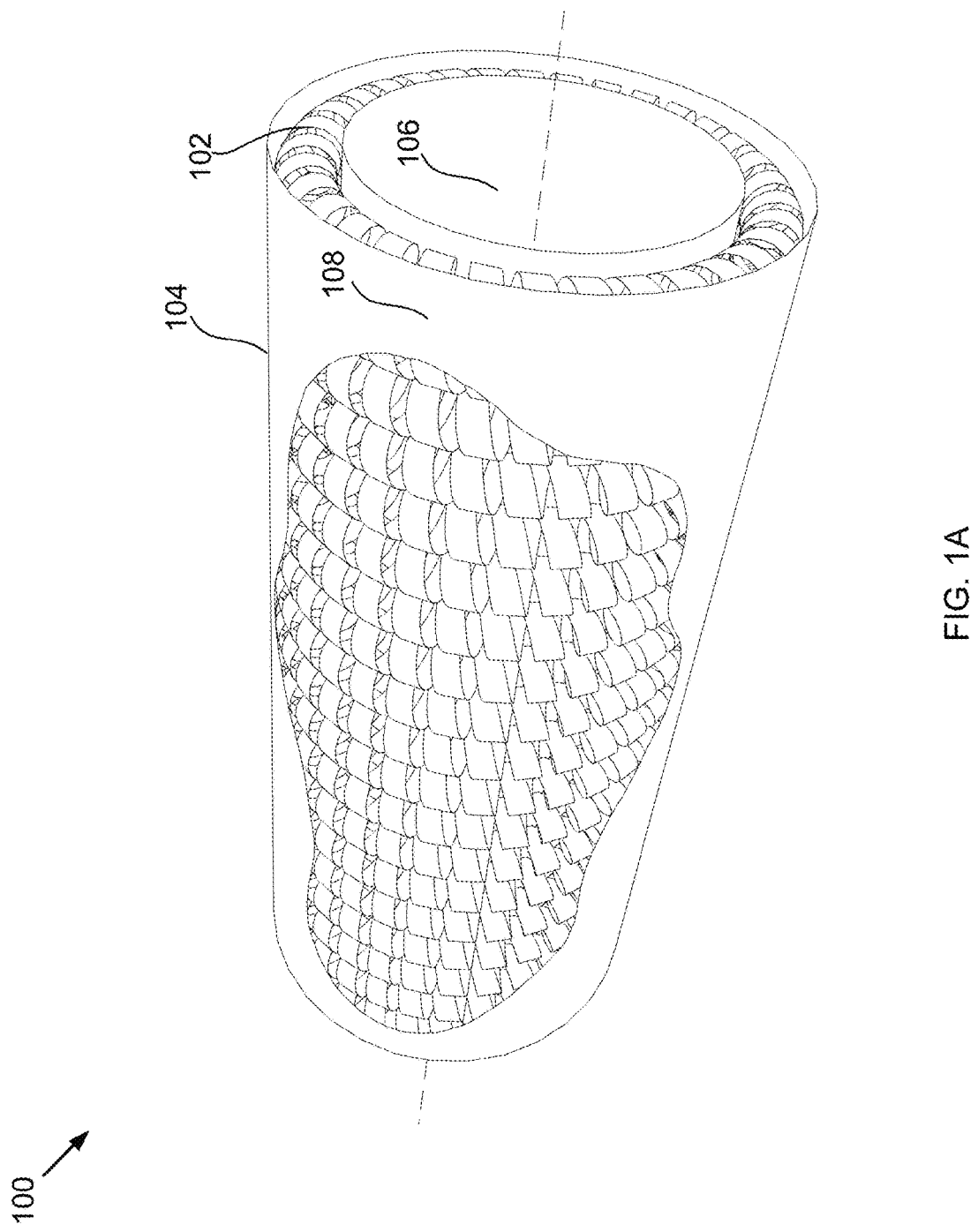

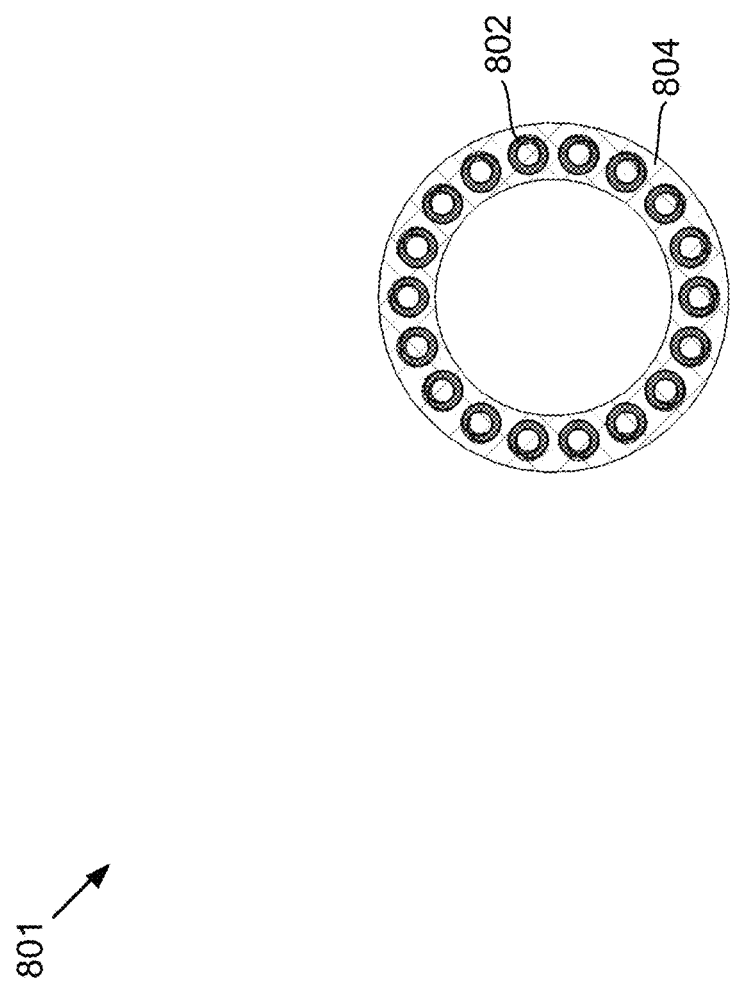

HOSES WITH ENDCAPSULATED SPRINGS

This invention was made with government support under DE-FE0028697 awarded by The Department of Energy. The government has certain rights in the invention.

FIELD OF THE INVENTION

This invention relates generally to hose and tube construction. More particularly, we are interested in hose and tube construction capable of handling cryogenic temperatures.

BACKGROUND

Liquid and slurry material handling requires many types of equipment. In some instances, the best equipment utilizes rubber and other flexible hoses, including tubing, to control and move these materials. This includes pinch valves and peristaltic pumps. Each of these require a flexible hose to operate. These flexible hoses wear out, and longer life, more durable flexible hoses are required, especially in applications where the flexible hose is pinched and required to return to the fully-open hose after removal of the pinching force. Useful life of the hose is not only dependent on the resilient nature of the flexible hose but also on the magnitude of closure forces imposed on the hose. A fine line exists between effective closure force and undue or excessive force that physically crushes the hose. The inventors are unaware of a suitable hose that addresses these issues effectively.

Further, with recent advances in large scale cryogenic processes, the ability to move large quantities of cryogenic liquids and slurries is becoming increasingly critical. Flexible hoses have limited usability at cryogenic temperatures. As such, flexible hosing suitable for operations at cryogenic temperatures is also required, as the problems mentioned earlier are only exacerbated at cryogenic temperatures.

U.S. Pat. Nos. 6,390,141 and 6,742,545, to Fisher, et al., teaches collapse-resistant hose construction. A flexible hose is disclosed that includes multiple elastomeric layers with a helically wound reinforcement element, such as cord or wire. The present disclosure differs from this prior art disclosure in that the reinforcement element of the prior art disclosure is an unwound spring wrapped around the hose, not a spring wrapped without unwinding around the hose. Further, the prior art disclosure teaches against making the hose pinchable, as it adds the helically wound reinforcement element to prevent collapse. This prior art disclosure is pertinent and may benefit from the devices disclosed herein and is hereby incorporated for reference in its entirety for all that it teaches.

U.S. Pat. No. 4,567,917, to Millard, teach a hose with wire braid reinforcement. The wire braid includes a plurality of interwoven strands of wires, and each strand includes a plurality of wires. The hose is made by a method including the steps of preforming wires to produce a helical tension spring configuration, combining a plurality of such wires under a uniform tension and twisting such wires to form strands, and braiding a plurality of such strands under high tension. The present disclosure differs from this prior art disclosure in that the wire braid is an unwound spring wrapped around the hose, not a spring wrapped without unwinding around the hose. Further, the prior art disclosure teaches against making the hose pinchable, as it adds the helically wound reinforcement element to prevent collapse. This prior art disclosure is pertinent and may benefit from the devices disclosed herein and is hereby incorporated for reference in its entirety for all that it teaches.

U.S. Pat. No. 3,197,173, to Taubenheim, teaches a pinch valve. The flexible sleeve, or liner, is embedded with cords of rayon or similar material to strengthen the liner against high line pressures adjacent to the pinch valve. However, these are cut away to allow for pinching. The present disclosure differs from this prior art disclosure in that the prior art disclosure uses cord, not springs, for wrapping the liner. Further, the cord is removed to allow for pinching. This prior art disclosure is pertinent and may benefit from the devices disclosed herein and is hereby incorporated for reference in its entirety for all that it teaches.

U.S. Pat. No. 3,724,807, to Jackson, teaches a pinch valve sleeve. The sleeve has an inner wall of an elastomeric material and reinforcing outer walls of fabric, with circumferential reinforcing members built into the outer wall of fabric at the ed portions of the valve sleeve. The present disclosure differs from this prior art disclosure in that the prior art disclosure uses fabrics to provide structural reinforcement but still allow pinching, not springs. This prior art disclosure is pertinent and may benefit from the devices disclosed herein and is hereby incorporated for reference in its entirety for all that it teaches.

U.S. Pat. Nos. 3,887,306 and 4,110,061, to Gerritsen, teaches a peristaltic pump and hose. The hose includes layers of helically and longitudinally wound threads. The threads of radially successive layers are wound at opposite angles of pitch, the threads extending in the longitudinal direction of the hose on the radially inward side of a layer of wound reinforcing thread. The present disclosure differs from this prior art disclosure in that the prior art disclosure uses threads, not springs, for wrapping the hose. This prior art disclosure is pertinent and may benefit from the devices disclosed herein and is hereby incorporated for reference in its entirety for all that it teaches.

SUMMARY

A device is disclosed comprising a pinchable hose with an inner wall and an outer wall. The hose comprises a flexible material and one or more springs. A central axis of the one or more springs is contained within a space between the inner wall and the outer wall of the hose.

The hose may be used as a sleeve in a pinch valve. The pinch valve may be actuated by an actuator comprising a manual actuator, an electric actuator, an electro-hydraulic actuator, a hydraulic actuator, an electro-pneumatic actuator, or a pneumatic actuator. The actuator may comprise an internal stop that prevents over-compression of the hose.

The hose may be used as an internal hose in a peristaltic pump. The peristaltic pump may comprise a shoe-style peristaltic pump or a roller-style peristaltic pump. The roller-style peristaltic pump may comprise a fixed occlusion style roller or a spring-loaded roller style.

The flexible material may comprise polytetrafluoroethylene, fluorinated ethylene propylene, perfluoroalkoxy polymer resin, polyether ether ketone, other polyaryl ether ketones, polyimides, the polyimide sold under the trademark of Vespel®, poly-oxydiphenylene-pyromellitimide, platinum-cured silicone, peroxide-cured silicone, thermoplastics, other rubbers, other polymers, or combinations thereof. The one or more springs may comprise steel, titanium, aluminum, nickel, cobalt, alloys thereof, and combinations thereof.

The hose may operate at cryogenic temperatures. A cryogenic fluid may be passed through the hose, the cryogenic fluid comprising a liquid, a solid, or a combination thereof. The cryogenic liquid may comprise a liquid with a freezing point lower than the solids. The solids may comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, particulates, other heavy metals, condensed organics, soot, inorganic ash components, salts, or combinations thereof.

The one or more springs may consist of repeating parallel o-shaped rings formed into the cylindrical shape.

The one or more springs may contain a smaller spring inside the one or more springs.

The one or more springs may form a spiral or spirals.

The springs may be arrayed lengthwise in parallel with the inner wall.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 1A-B show an isometric view of a hose and a cross-sectional view of the hose.

FIGS. 8A-B show an isometric view of a hose and a cross-sectional view of the hose.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Throughout this disclosure, the term "hose" also refers to "tube."

Figure 1B:
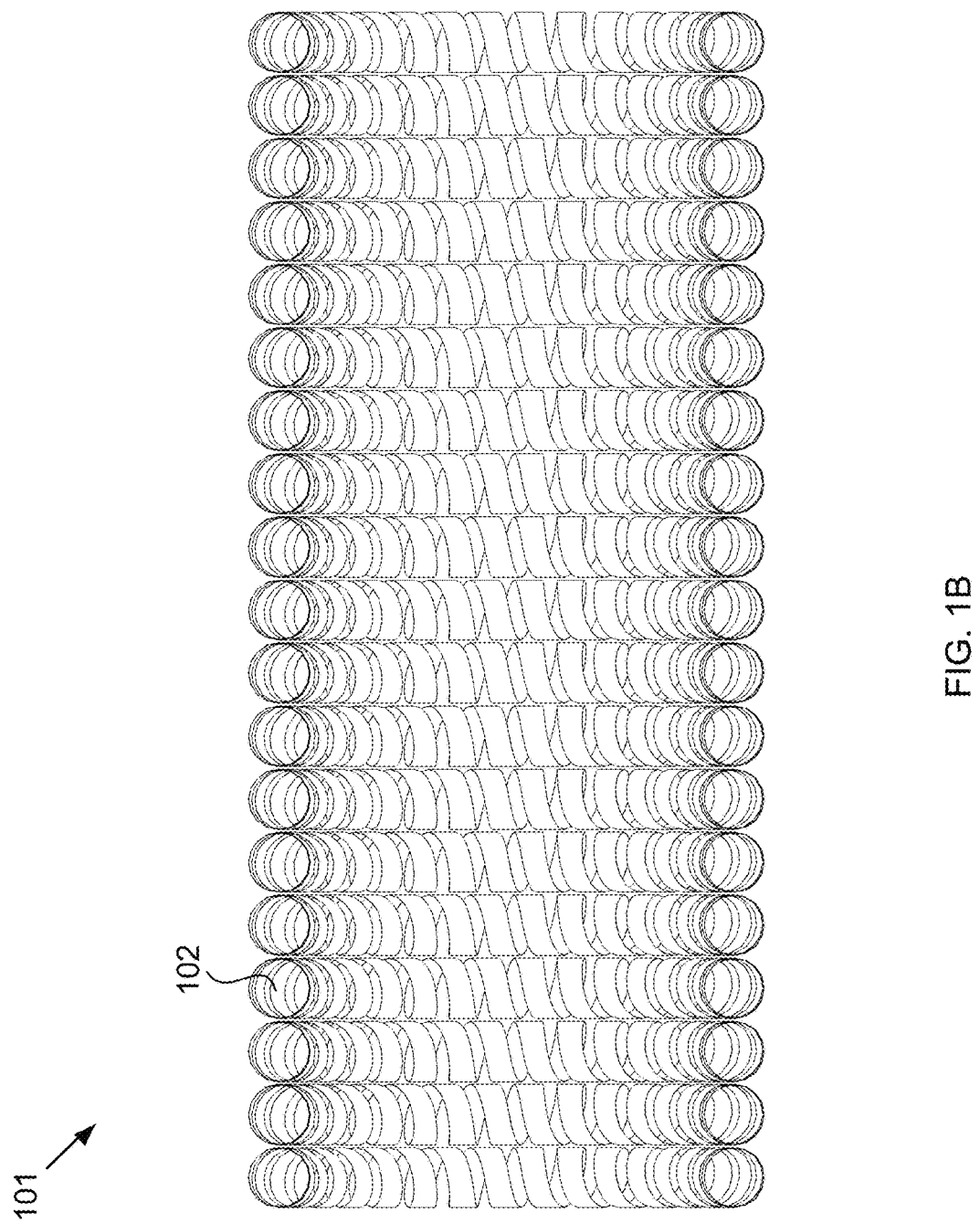

Referring to FIGS. 1A-B, an isometric view of a hose is shown at 100 and a cross-sectional view of the hose is shown at 101, as per one embodiment of the present invention. Hose 104, comprising a flexible material, contains ring-shaped helical springs 102, arrayed within the space between inner wall 106 and outer wall 108. Hose 104 is pinchable and also rebounds back to the fully-open state when the pinching force is removed because of the arrangement of helical springs 102.

Figure 2A:
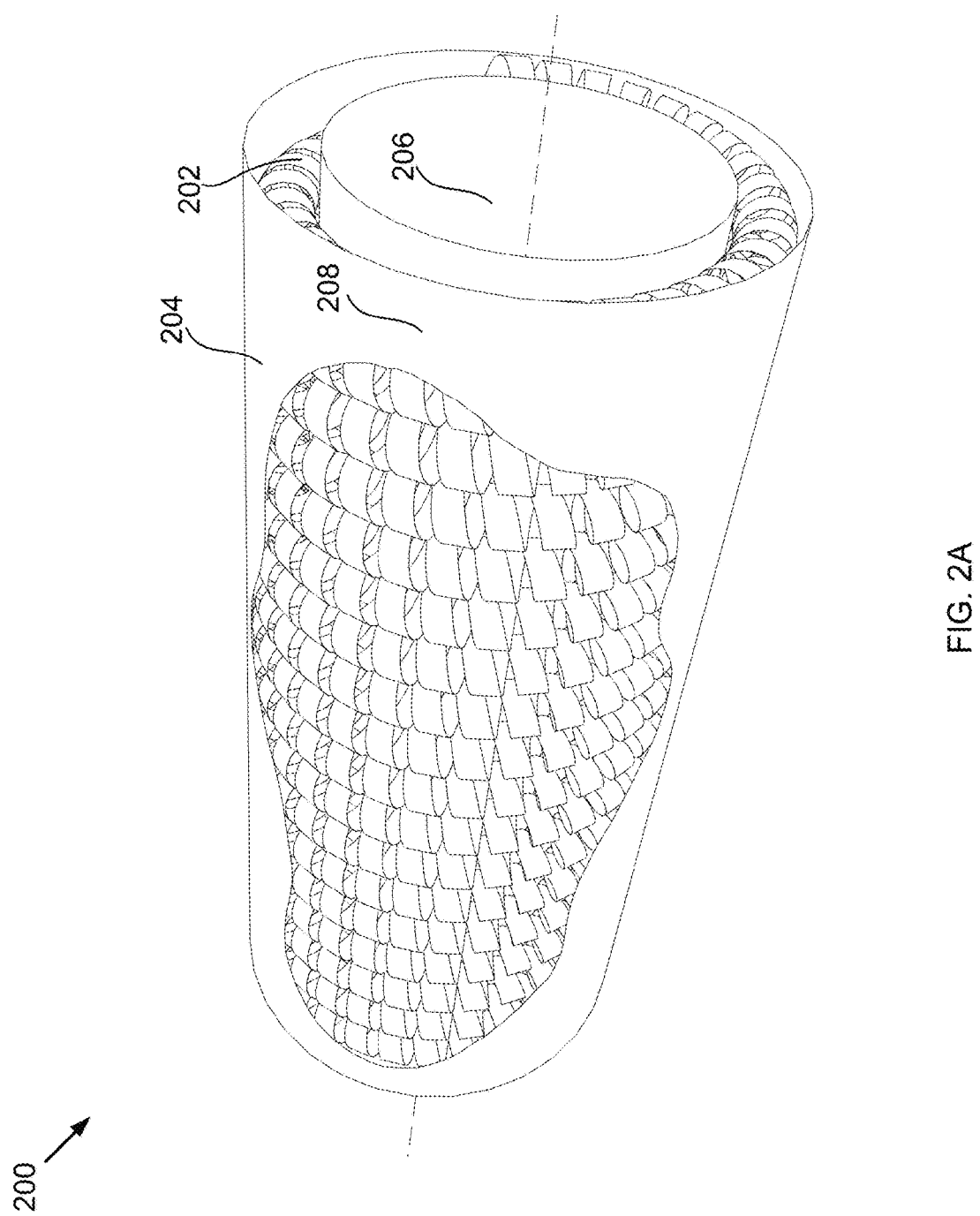
FIGS. 2A-B show an isometric view of a hose and a cross-sectional view of the hose.
Figure 2B:
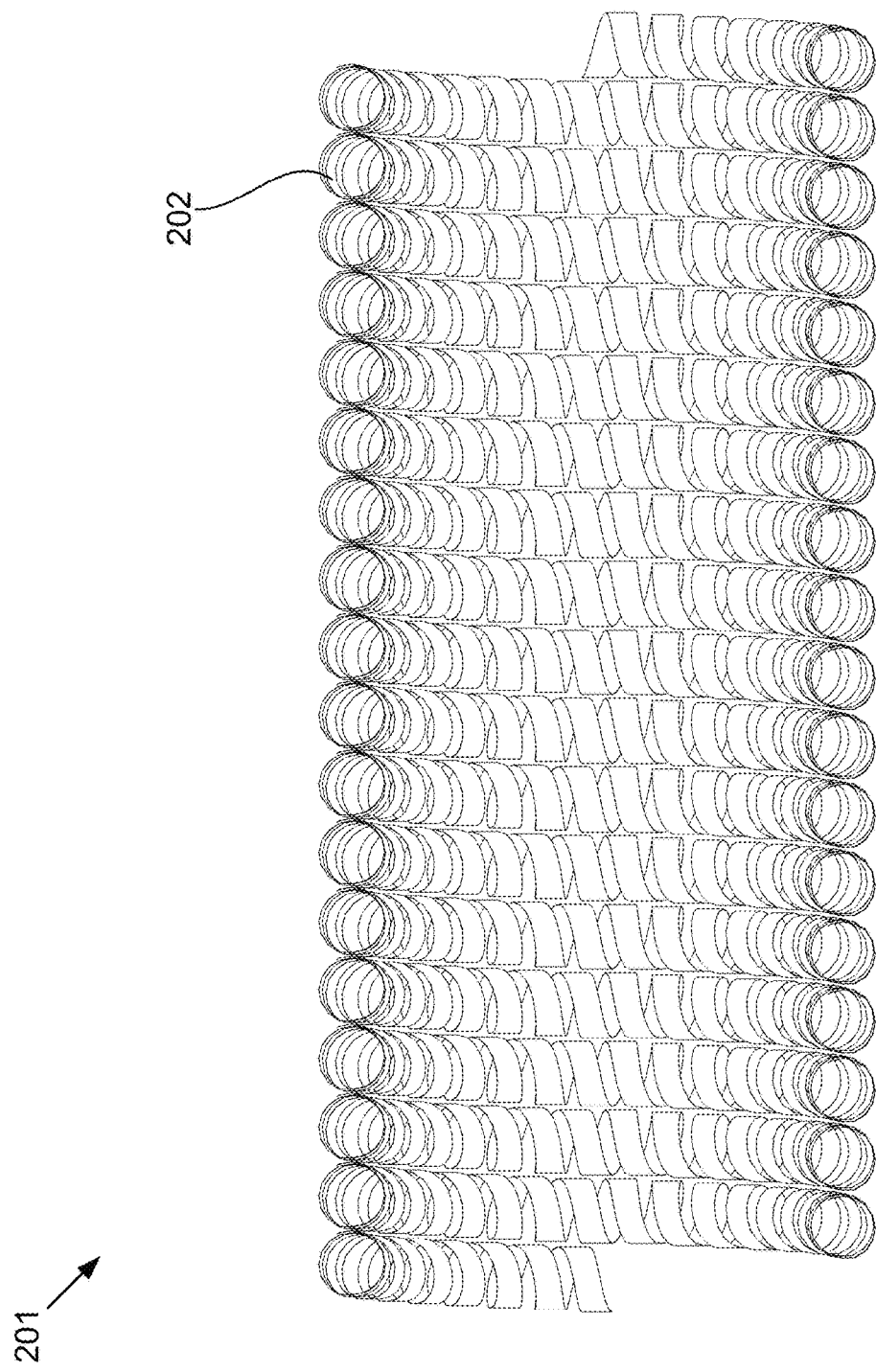

Referring to FIGS. 2A-B, an isometric view of a hose is shown at 200 and a cross-sectional view of the hose is shown at 201, as per one embodiment of the present invention. Hose 204, comprising a flexible material, contains helical spring 202, arrayed within the space between inner wall 206 and outer wall 208. Hose 204 is pinchable and also rebounds back to the fully-open state when the pinching force is removed because of the arrangement of helical springs 202.

Figure 3A:
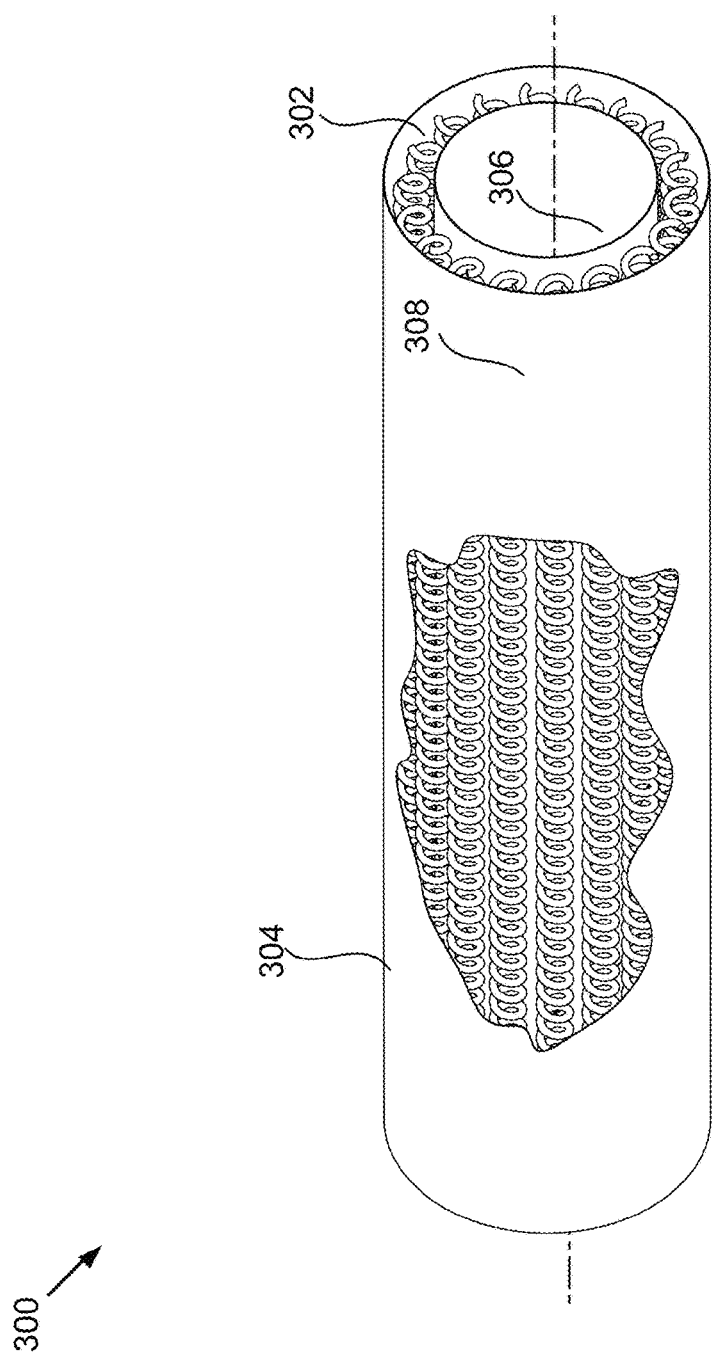
FIGS. 3A-B show an isometric view of a hose and a cross-sectional view of the hose.
Figure 3B:
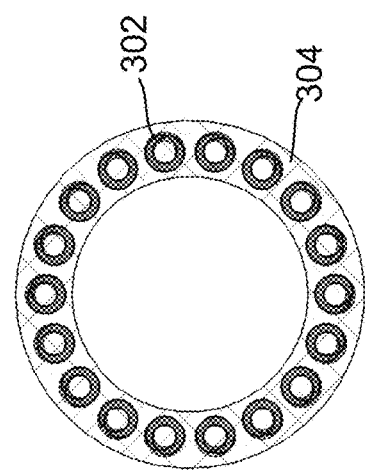

Referring to FIGS. 3A-B, an isometric view of a hose is shown at 300 and a cross-sectional view of the hose is shown at 301, as per one embodiment of the present invention. Hose 304, comprising a flexible material, contains compression springs 302, arrayed lengthwise within the space between inner wall 306 and outer wall 308. Hose 304 is pinchable and also rebounds back to the fully-open state when the pinching force is removed because of the arrangement of compression springs 302.

Figure 4A:
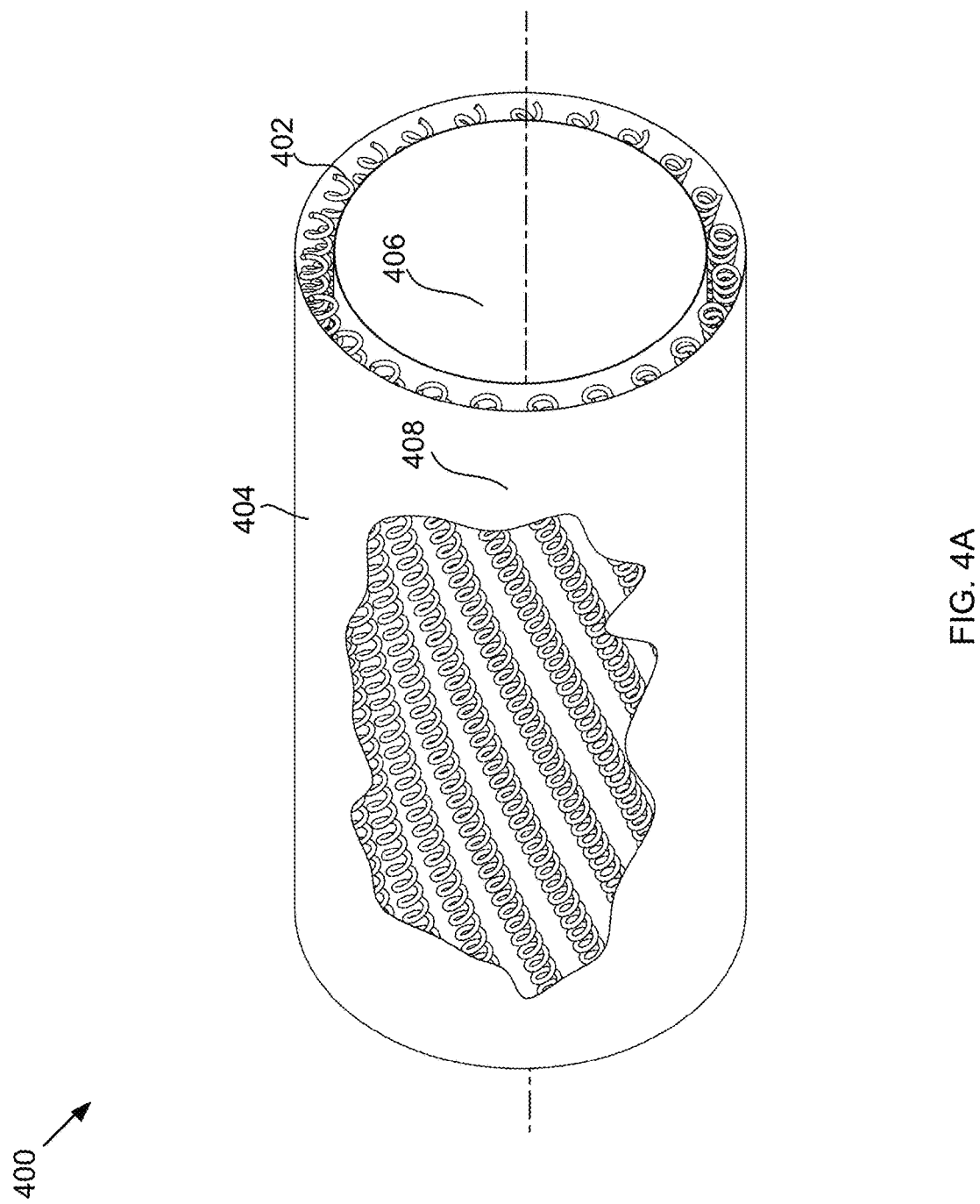
FIGS. 4A-B show an isometric view of a hose and a lengthwise cross-sectional view of the hose.
Figure 4B:
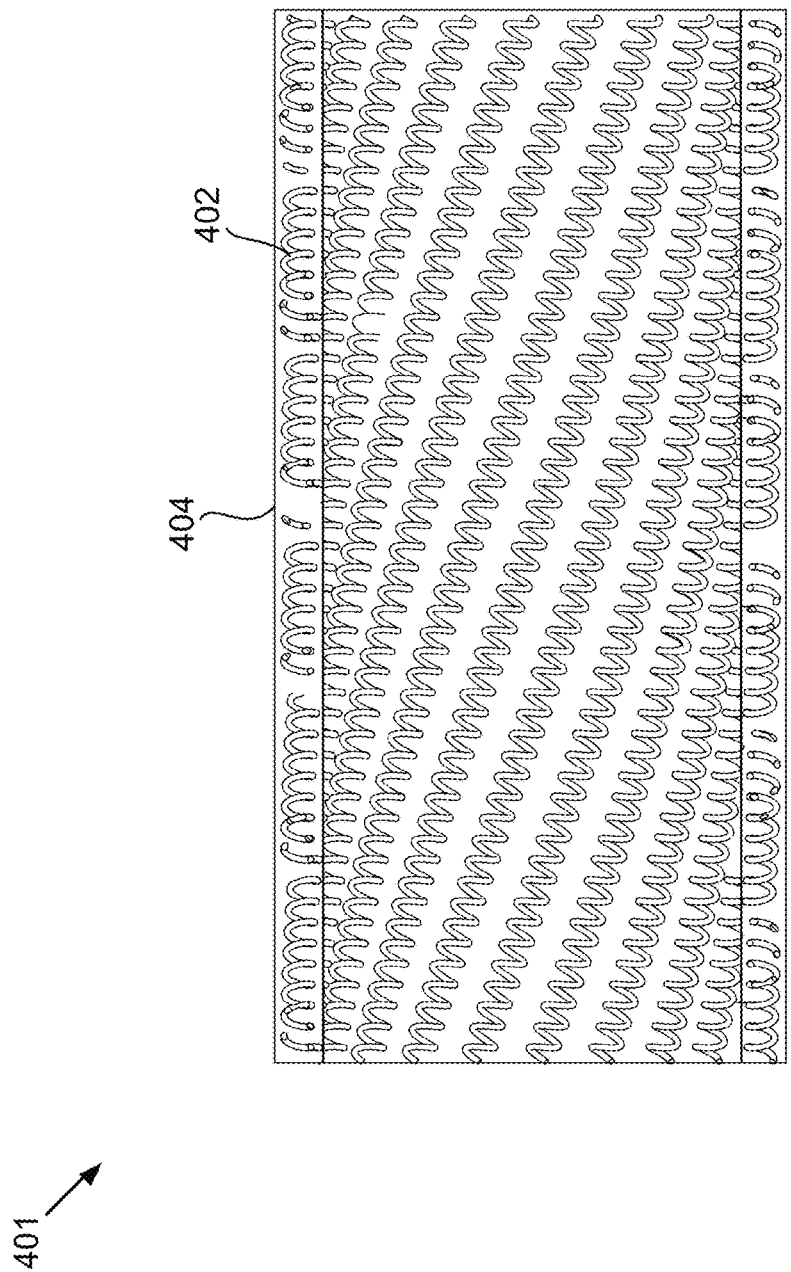

Referring to FIGS. 4A-B, an isometric view of a hose is shown at 400 and a lengthwise cross-sectional view of the hose is shown at 401, as per one embodiment of the present invention. Hose 404, comprising a flexible material, contains compression springs 402, arrayed lengthwise and helically within the space between inner wall 406 and outer wall 408. Hose 404 is pinchable and also rebounds back to the fully-open state when the pinching force is removed because of the arrangement of compression springs 402.

Figure 5A:
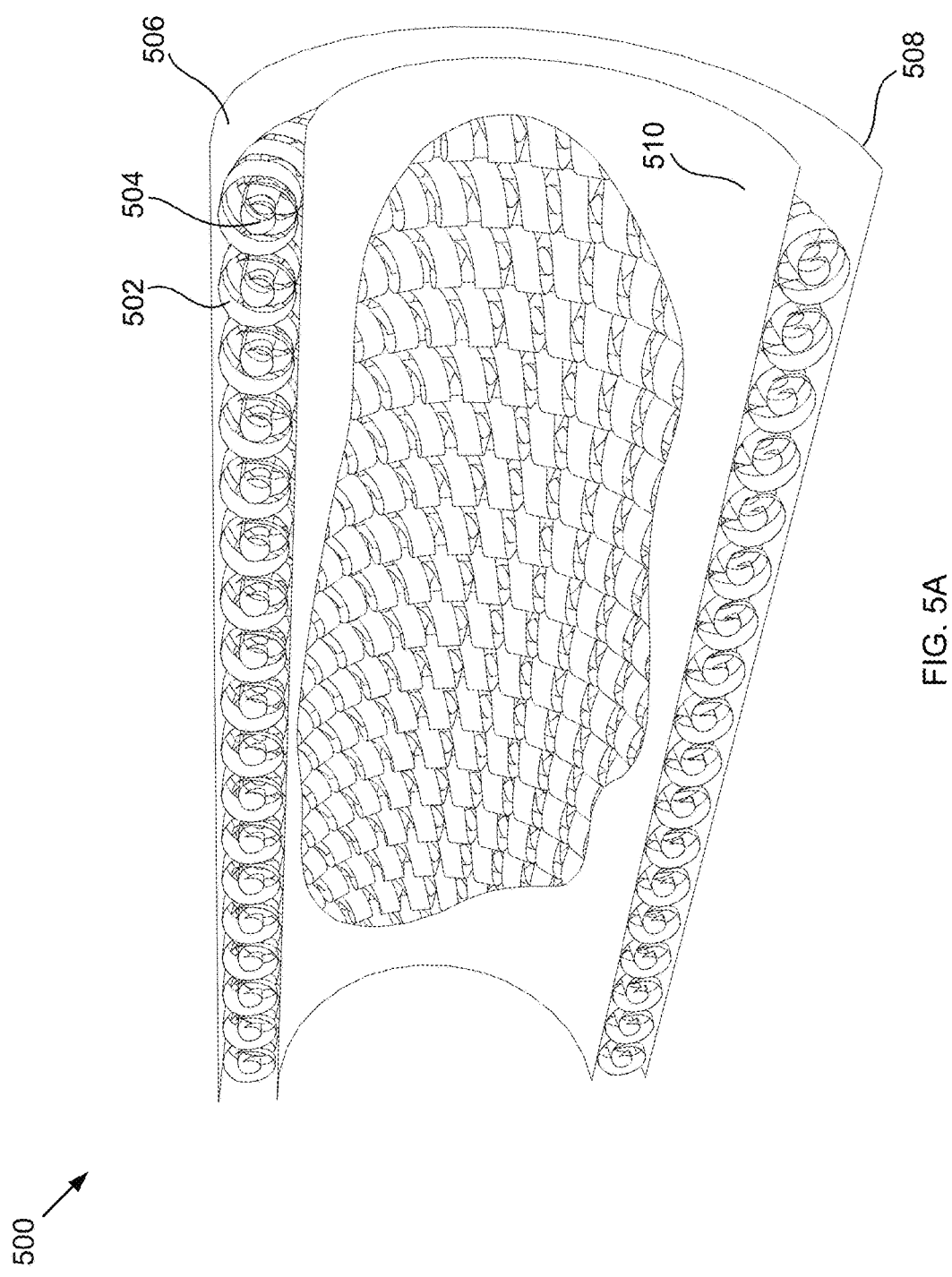
FIGS. 5A-B show a cutaway isometric view of a hose and a cross-sectional view of the hose.
Figure 5B:
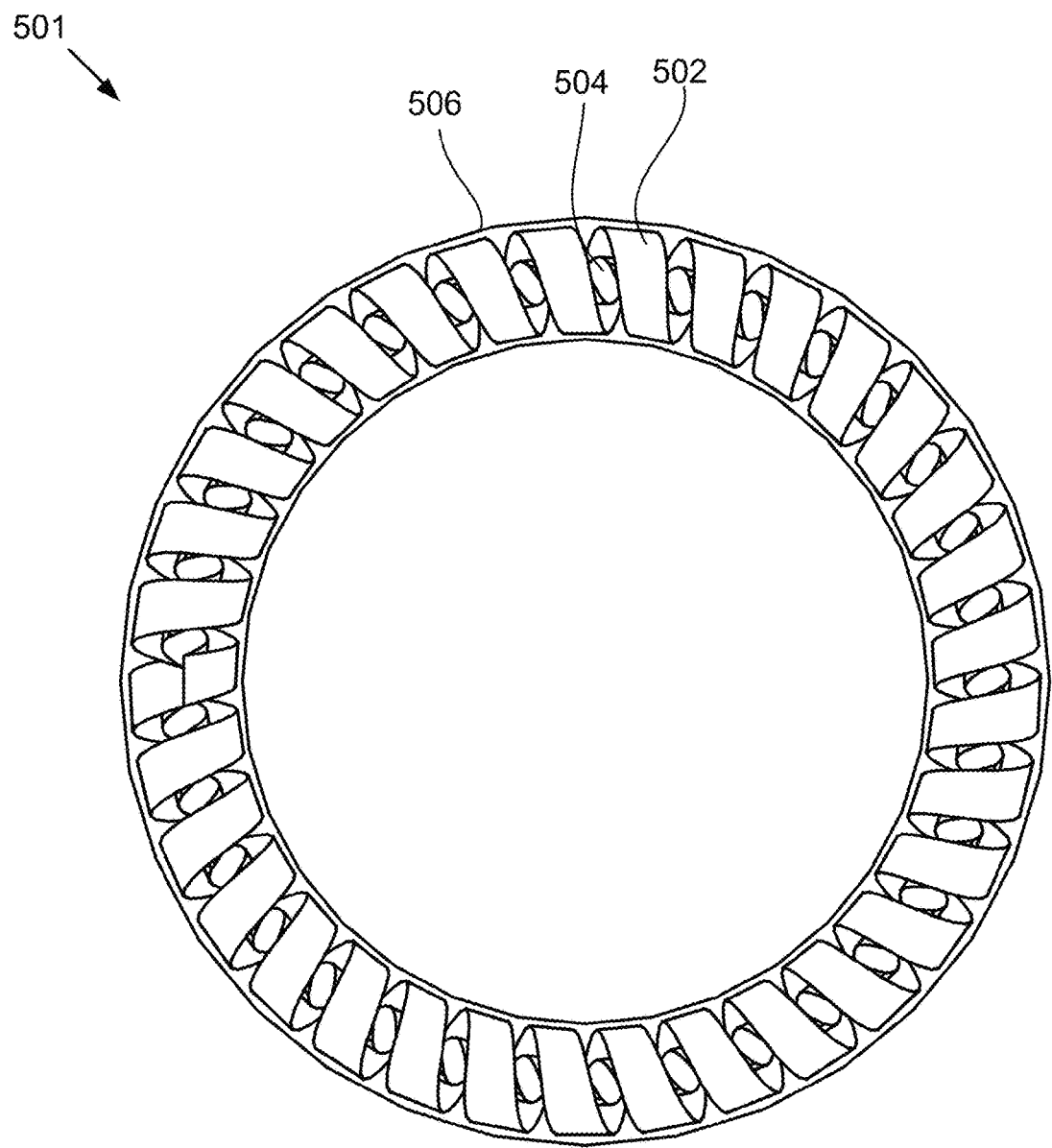

Referring to FIGS. 5A-B, a cutaway isometric view of a hose is shown at 500 and a cross-sectional view of the hose is shown at 501, as per one embodiment of the present invention. Hose 506, comprising a flexible material, contains ring-shaped helical springs 502 within the space between inner wall 508 and outer wall 510. Ring-shaped helical springs 502 contain internal-helical springs 504. Hose 504 is pinchable and also rebounds back to the fully-open state when the pinching force is removed because of the arrangement of ring-shaped helical springs 502 and internal-helical springs 504.

Figure 6B:
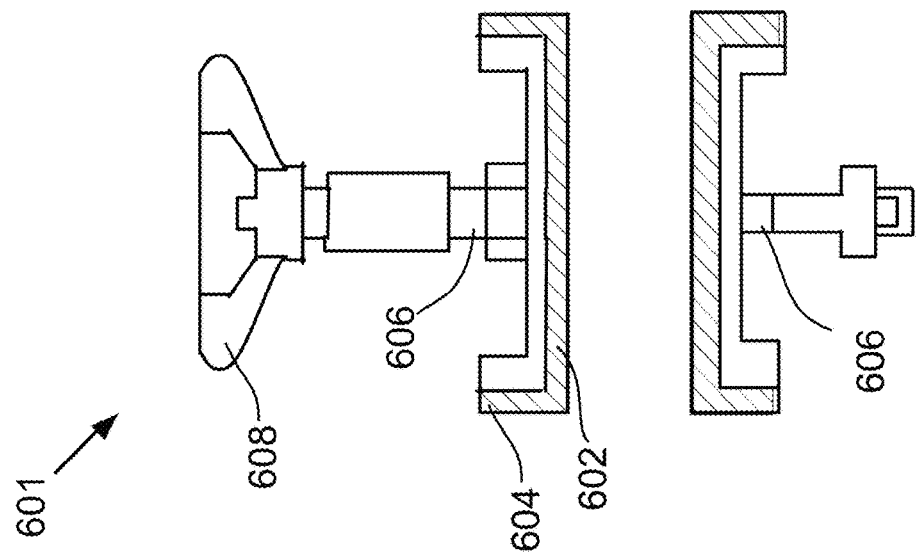
FIGS. 6A-B show a cross-sectional view of a pinch valve.
Figure 6A:
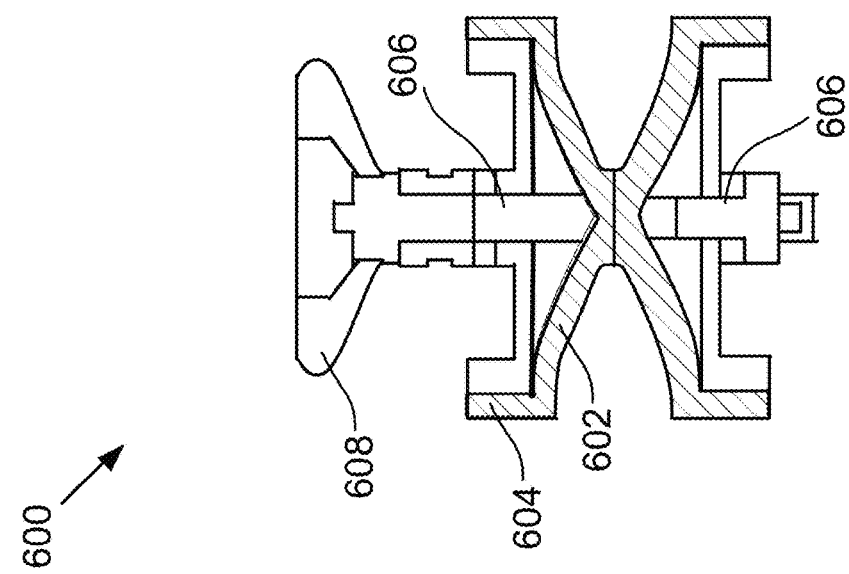

Referring to FIGS. 6A-6B, a cross-sectional view of a pinch valve is shown closed at 600 and open at 601, as per one embodiment of the present invention. Sleeve 602, comprising a flexible material, contains one or more springs within the space between the inner wall and outer wall of sleeve 602. The flexible material is also used to make sleeve flanges 604, which are used to seal the pinch valve when inserted in piping. Plungers 606 are moved in and out of the pinch valve by manual actuator 608, with the pinch valve fully closed in 600 and fully open in 601. In some embodiments, the pinch valve is operated partially closed, in which case, the pinch valve is a control valve. In some embodiments, manual actuator 608 is replaced by an electric actuator, an electro-hydraulic actuator, a hydraulic actuator, an electro-pneumatic actuator, or a pneumatic actuator. In some embodiments, the pinch valve further comprises an internal stop that prevents over-compression of the sleeve. In some embodiments, the one or more springs consist of repeating parallel o-shaped rings. In some embodiments, each of the one or more springs contains a smaller spring inside the one or more springs. In some embodiments, the spring spirals around the cylindrical shape helically. In some embodiments, the springs are arrayed lengthwise in parallel along a long axis of the hose. In some embodiments, the springs wrap helically a radius of the cylindrical shape. In some embodiments, the one or more springs comprise compression springs, extension springs, helical springs, conical springs, hourglass springs, constant-pitch springs, variable-pitch springs, barrel springs, square springs, oval springs, flat-coil springs, scope-channel flat coil springs, magazine springs, or combinations thereof.

Figure 7:
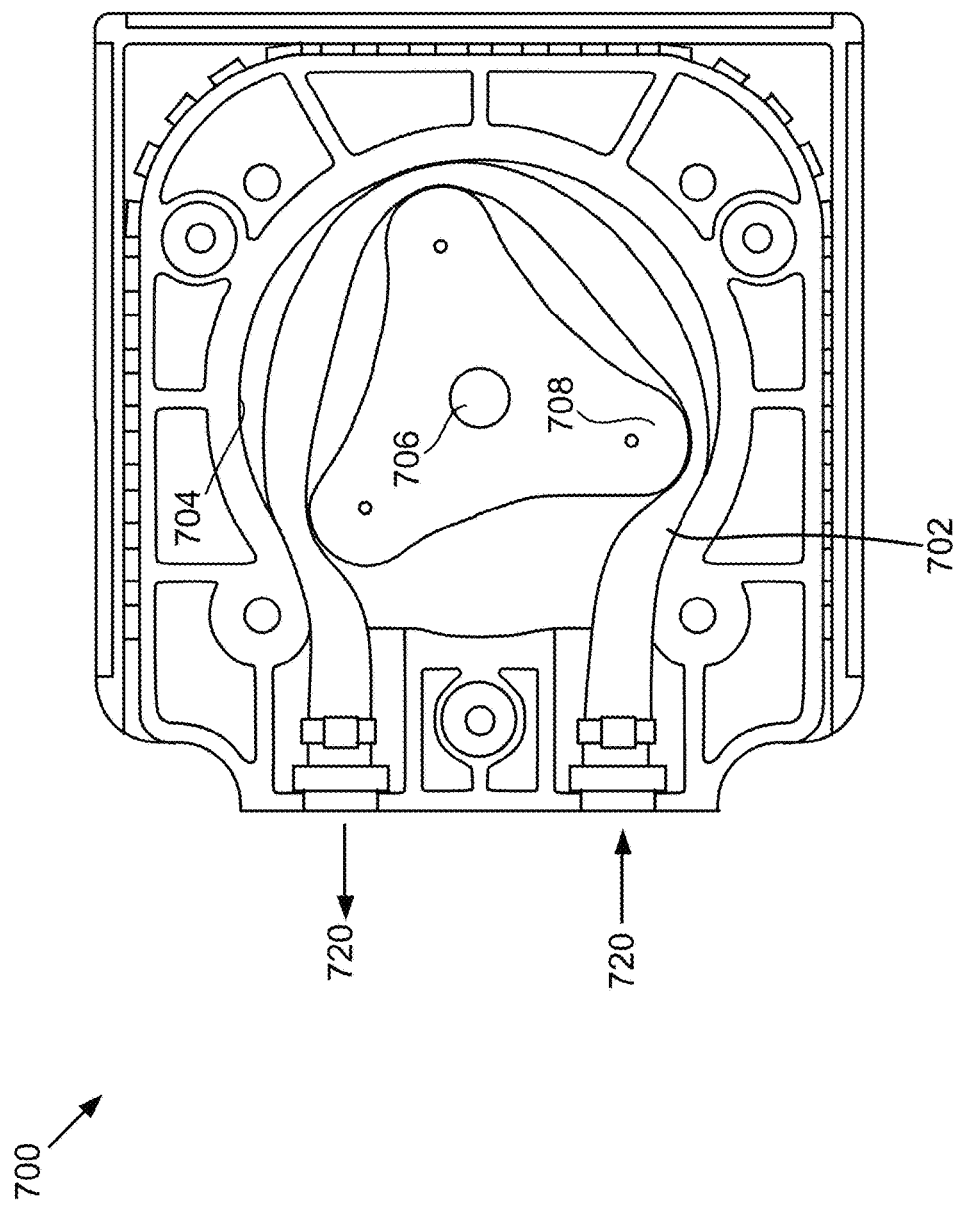
FIG. 7 shows a cross-sectional view of a peristaltic pump.

Referring to FIG. 7, a cross-sectional view of a peristaltic pump is shown at 700, as per one embodiment of the present invention. Hose 702, comprising a flexible material, contains one or more springs within the space between the inner wall and the outer wall of hose 702. Rotor 706 rotates and causes shoes 708 to pinch hose 702, advancing trapped fluid 720 through hose 702 and out of the peristaltic pump. In some embodiments, shoes 708 are replaced by rollers, the rollers comprising a fixed occlusion style roller or a spring-loaded roller style. In some embodiments, the one or more springs consist of repeating parallel o-shaped rings. In some embodiments, each of the one or more springs contains a smaller spring inside the one or more springs. In some embodiments, the spring spirals helically. In some embodiments, the springs are arrayed lengthwise in parallel along a long axis of the hose. In some embodiments, the springs wrap helically in parallel around the hose. In some embodiments, the one or more springs comprise compression springs, extension springs, helical springs, conical springs, hourglass springs, constant-pitch springs, variable-pitch springs, barrel springs, square springs, oval springs, flat-coil springs, scope-channel flat coil springs, magazine springs, or combinations thereof.

Figure 8A:
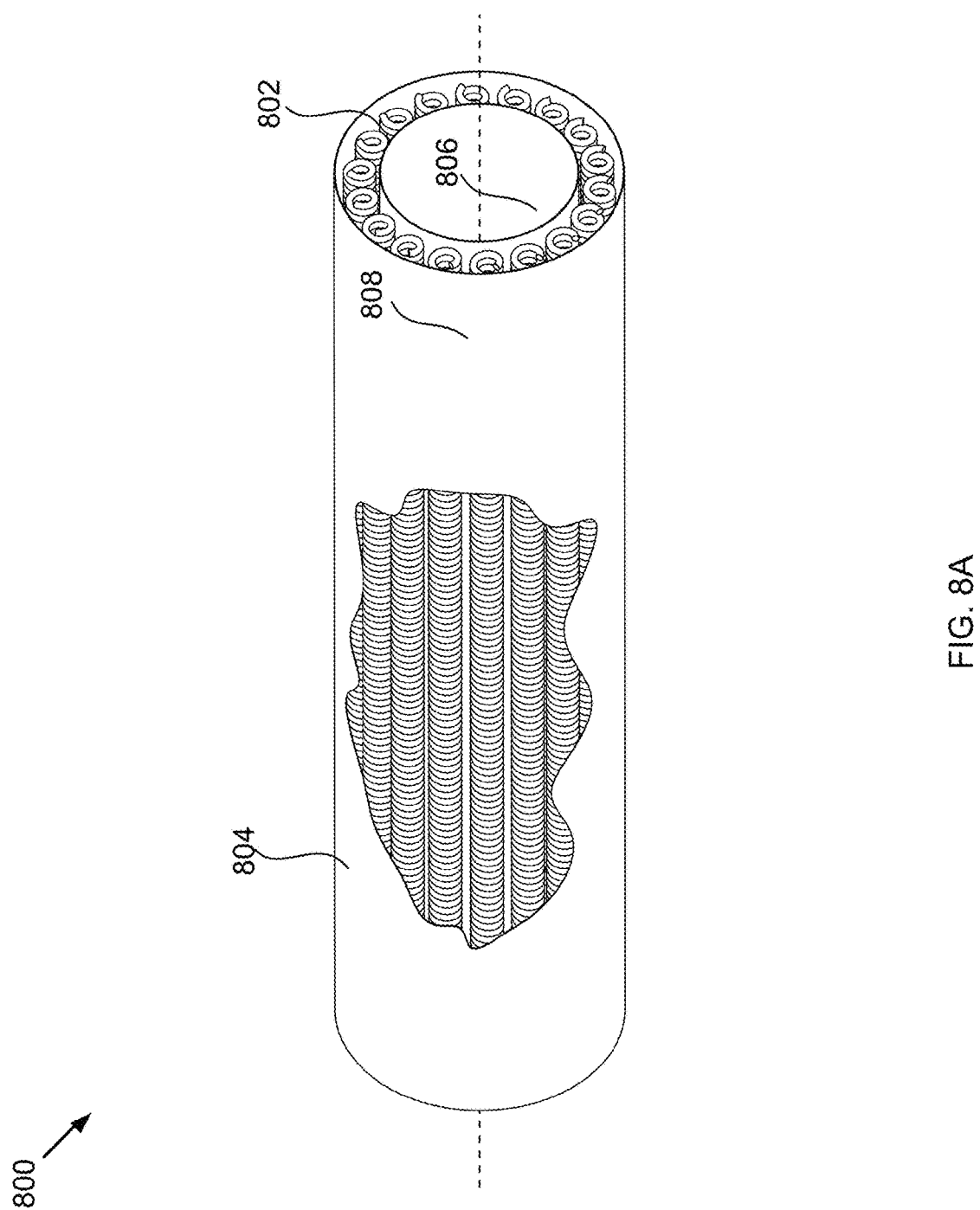

Referring to FIGS. 8A-B, an isometric view of a hose is shown at 800 and a cross-sectional view of the hose is shown at 801, as per one embodiment of the present invention. Hose 804, comprising a flexible material, contains extension springs 802, arrayed lengthwise within the space between inner wall 806 and outer wall 808. Hose 804 is pinchable and also rebounds back to the fully-open state when the pinching force is removed because of the arrangement of compression springs 302.

Figure 9A:
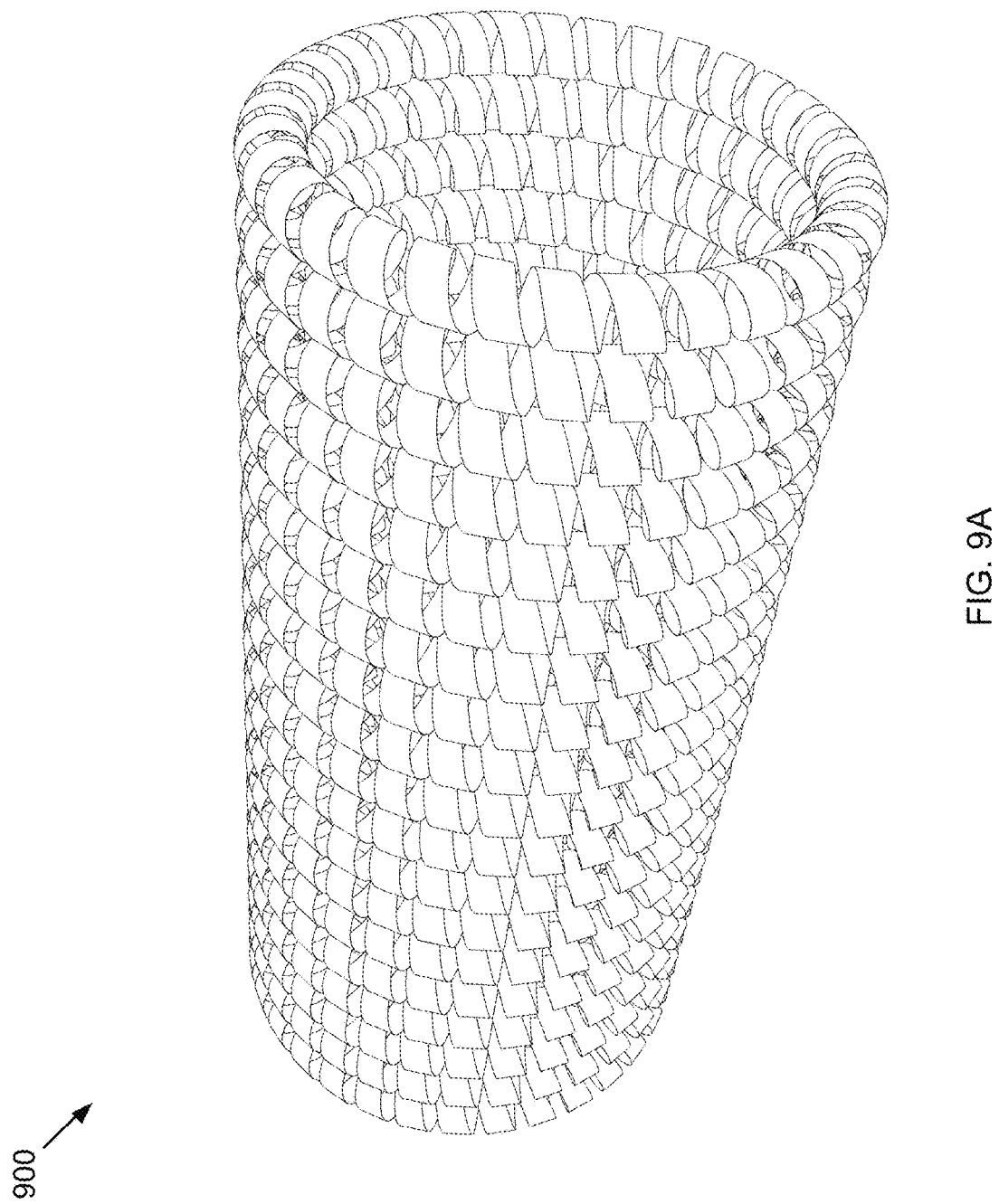
FIGS. 9A-C shows an isometric view of a hose, with the flexible material not shown for clarity.
Figure 9B:
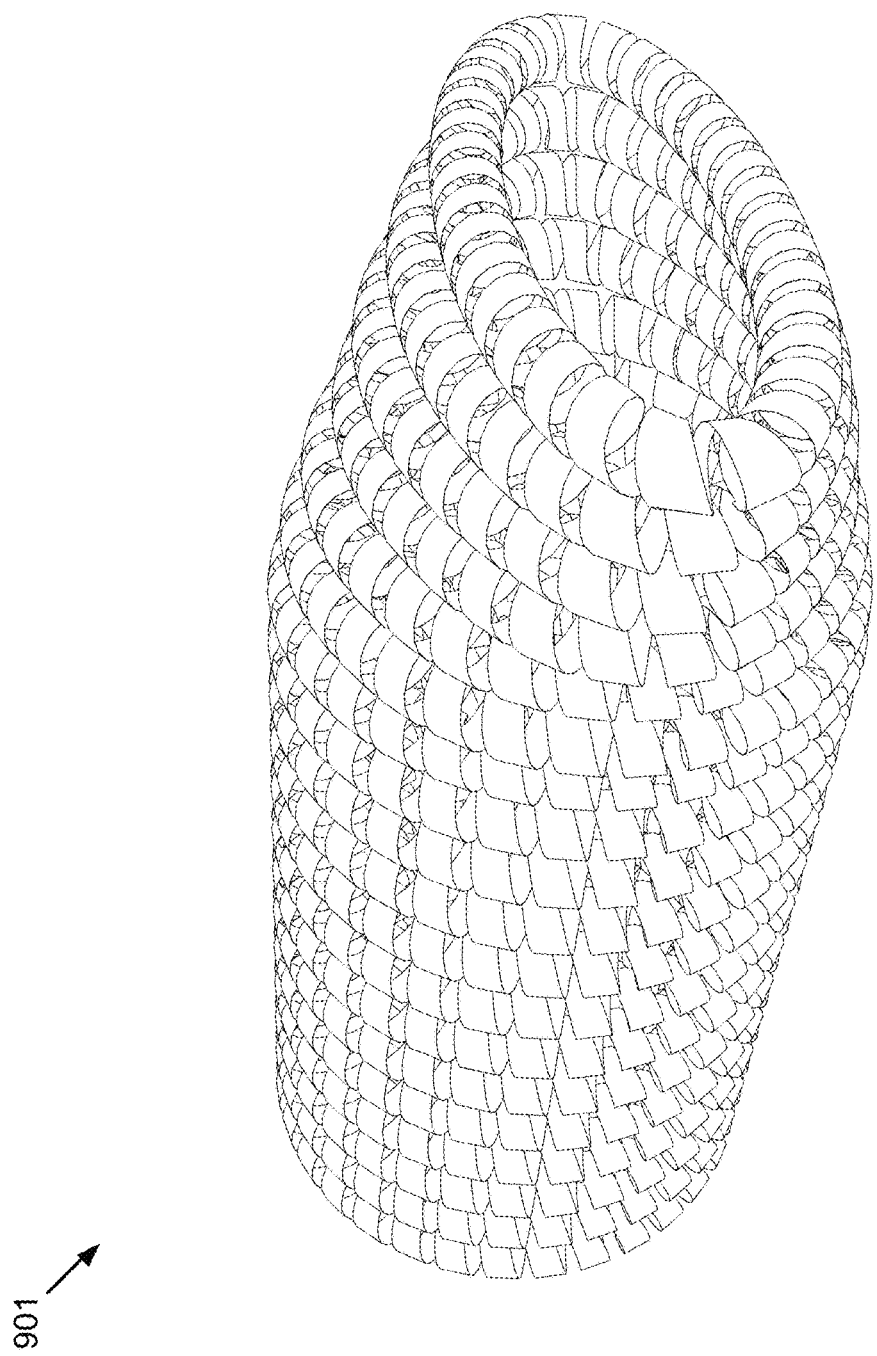
Figure 9C:
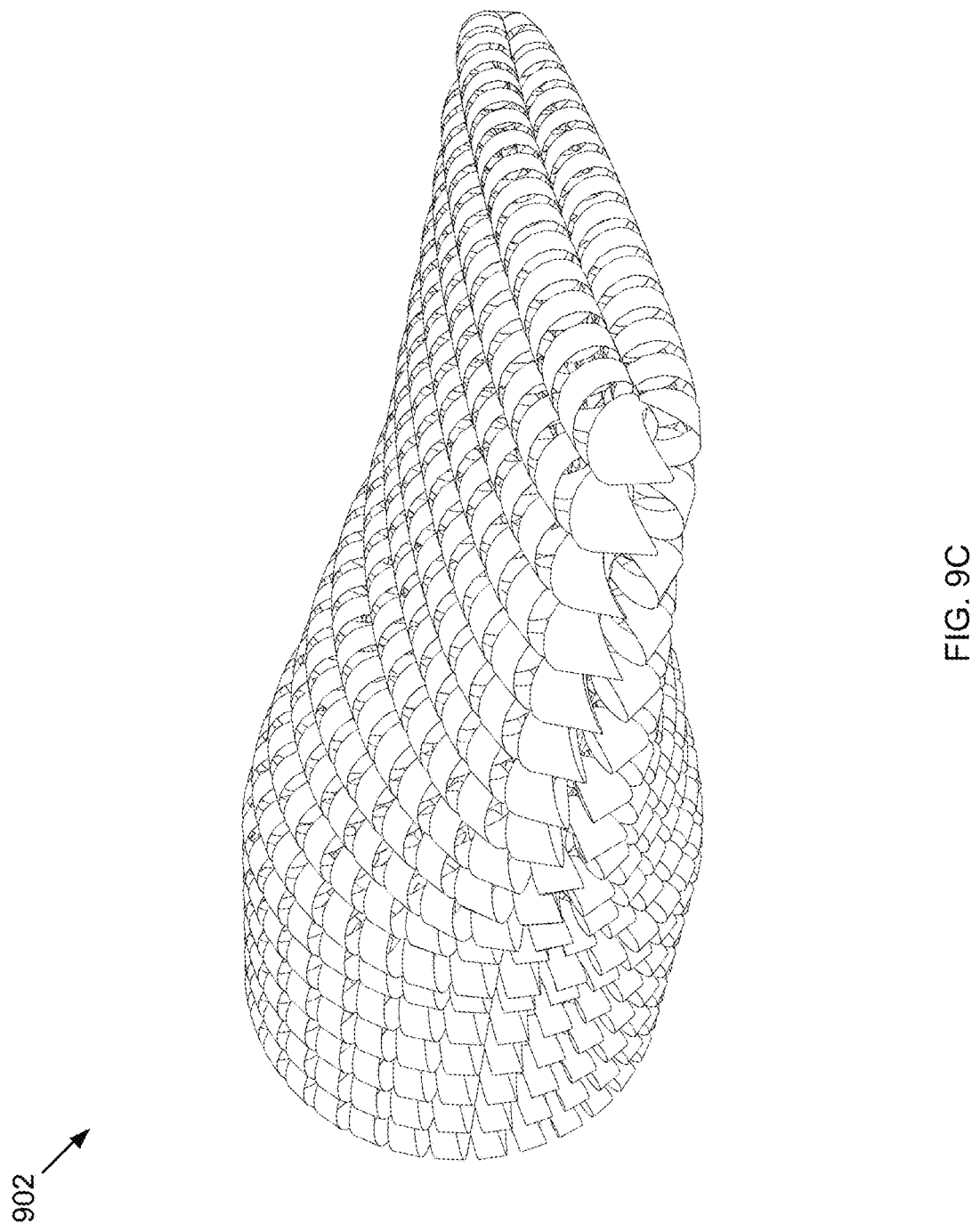

Referring to FIGS. 9A-C, an isometric view of hose 104 of FIG. 1A, with the flexible material not shown for clarity, is shown at 900, 901, and 902, as per one embodiment of the present invention. The hose is fully open at 900. A pinching force is applied to the hose, resulting in the hose beginning to close in 901, and fully closing at 902. Removal of the pinching force reverses the process, resulting in the hose partially opening at 901 and being fully open at 900. In some embodiments, this pinching force is applied from the top of the hose, the top and bottom of the hose, or by a rolling pinching force.

In some embodiments, the flexible material comprises polytetrafluoroethylene, fluorinated ethylene propylene, perfluoroalkoxy polymer resin, polyether ether ketone, other polyaryl ether ketones, polyimides, the polyimide sold under the trademark of Vespel®, poly-oxydiphenylene-pyromellitimide, platinum-cured silicone, peroxide-cured silicone, thermoplastics, other rubbers, other polymers, or combinations thereof. In some embodiments, the one or more springs comprise steel, titanium, aluminum, nickel, cobalt, alloys thereof, and combinations thereof.

In some embodiments, the hose operates at cryogenic temperatures. In some embodiments, a cryogenic fluid is passed through the hose, the cryogenic fluid comprising a liquid, a solid, or a combination thereof. In some embodiments, the cryogenic liquid comprises a liquid with a freezing point lower than the solids. In some embodiments, the solids comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, particulates, other heavy metals, condensed organics, soot, inorganic ash components, salts, or combinations thereof.

In some embodiments, the one or more springs consist of repeating parallel o-shaped rings along the hose. In some embodiments, each of the one or more springs contains a smaller spring inside the one or more springs. In some embodiments, the one or more springs spiral within the space. In some embodiments, the springs are arrayed lengthwise in parallel along a long axis of the hose in parallel with the inner wall.

The invention claimed is:

1. A device comprising:
   a pinchable hose with an inner wall and an outer wall, the hose comprising a flexible material and one or more springs, wherein a central axis of each helix of the one or more springs is contained within a space between the inner wall and the outer wall of the hose.

2. The device of claim 1, wherein the hose is used as a sleeve in a pinch valve.

3. The device of claim 2, wherein the pinch valve is actuated by an actuator comprising a manual actuator, an electric actuator, an electro-hydraulic actuator, a hydraulic actuator, an electro-pneumatic actuator, or a pneumatic actuator.

4. The device of claim 3, wherein the actuator comprises an internal stop that prevents over-compression of the hose.

5. The device of claim 1, wherein the hose is used as an internal hose in a peristaltic pump.

6. The device of claim 5, wherein the peristaltic pump comprises a shoe-style peristaltic pump or a roller-style peristaltic pump.

7. The device of claim 1, wherein the peristaltic pump comprises a roller-style peristaltic pump comprising a fixed occlusion style roller or a spring-loaded roller style.

8. The device of claim 1, wherein the flexible material comprises polytetrafluoroethylene, fluorinated ethylene propylene, perfluoroalkoxy polymer resin, polyether ether ketone, other polyaryl ether ketones, polyimides, poly-oxydiphenylene-pyromellitimide, platinum-cured silicone, peroxide-cured silicone, thermoplastics, other rubbers, other polymers, or combinations thereof.

9. The device of claim 8, wherein the one or more springs comprise steel, titanium, aluminum, nickel, cobalt, alloys thereof, and combinations thereof.

10. The device of claim 9, wherein the one or more springs comprise compression springs, extension springs, helical springs, conical springs, hourglass springs, constant-pitch springs, variable-pitch springs, barrel springs, square springs, oval springs, flat-coil springs, scope-channel flat coil springs, magazine springs, or combinations thereof.

11. The device of claim 9, wherein the hose operates at cryogenic temperatures and a cryogenic fluid is passed through the hose, the cryogenic fluid comprising a liquid, a solid, or a combination thereof.

12. The device of claim 9, wherein the hose operates at cryogenic temperatures and a cryogenic fluid is passed through the hose, the cryogenic fluid comprising a liquid and a solid, wherein the liquid has a freezing point lower than the solids.

13. The device of claim 12, wherein the solids comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, particulates, other heavy metals, condensed organics, soot, inorganic ash components, salts, or combinations thereof.

14. The device of claim 9, wherein the one or more springs consist of repeating parallel o-shaped rings along the hose.

15. The device of claim 14, wherein each of the one or more springs contains a smaller spring inside the one or more springs.

16. The device of claim 9, wherein the spring forms a spiral within the space.

17. The device of claim 9, wherein the springs are arrayed lengthwise in parallel with the inner wall.

18. The device of claim 17, wherein the springs spiral within the space.

19. A device comprising:
- a pinch valve comprising a sleeve and a pinching device;
- the pinching device comprising one or more plungers that pinch the sleeve closed and a manual actuator, an electric actuator, an electro-hydraulic actuator, a hydraulic actuator, an electro-pneumatic actuator, or a pneumatic actuator, which moves the one or more plungers;
- an internal stop that prevents over-compression of the sleeve; and,
- the sleeve comprising an inner wall and an outer wall, with a flexible material and one or more springs, wherein a central axis of each helix of the one or more springs is contained within a space between the inner wall and the outer wall of the sleeve, wherein:
- the flexible material comprises polytetrafluoroethylene, fluorinated ethylene propylene, perfluoroalkoxy polymer resin, polyether ether ketone, other polyaryl ether ketones, polyimides, poly-oxydiphenylene-pyromellitimide, platinum-cured silicone, peroxide-cured silicone, thermoplastics, other rubbers, other polymers, or combinations thereof; and,
- the one or more springs comprise steel, titanium, aluminum, nickel, cobalt, alloys thereof, and combinations thereof.

20. A device comprising:
- a peristaltic pump comprising a hose, and a pumping device;
- the pumping device comprising a rotor, a shoe or roller mounted on the rotor, and a pump case, wherein the rotor turns the shoe or roller, progressively pinching the hose against the pump case, causing fluid in the hose to advance through the hose and out; and,
- the hose comprising an inner wall and an outer wall, with a flexible material and one or more springs, wherein a central axis of each helix of the one or more springs is contained within a space between the inner wall and the outer wall of the hose, wherein:
- the flexible material comprises polytetrafluoroethylene, fluorinated ethylene propylene, perfluoroalkoxy polymer resin, polyether ether ketone, other polyaryl ether ketones, polyimides, poly-oxydiphenylene-pyromellitimide, platinum-cured silicone, peroxide-cured silicone, thermoplastics, other rubbers, other polymers, or combinations thereof; and,
- the one or more springs comprise steel, titanium, aluminum, nickel, cobalt, alloys thereof, and combinations thereof.

* * * * *